(12) United States Patent
Lu et al.

(10) Patent No.: US 11,325,027 B1
(45) Date of Patent: May 10, 2022

(54) GAME CONTROLLER

(71) Applicant: DEXIN CORPORATION, New Taipei (TW)

(72) Inventors: Ho-Lung Lu, New Taipei (TW); Hsiu-Hsuan Lin, Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/214,910

(22) Filed: Mar. 28, 2021

(30) Foreign Application Priority Data

Nov. 11, 2020 (TW) .................................. 109139261

(51) Int. Cl.
| | |
|---|---|
| *A63F 13/24* | (2014.01) |
| *A63F 13/92* | (2014.01) |
| *A63F 13/235* | (2014.01) |
| *A63F 13/2145* | (2014.01) |
| *A63F 13/71* | (2014.01) |

(52) U.S. Cl.
CPC .......... *A63F 13/24* (2014.09); *A63F 13/2145* (2014.09); *A63F 13/235* (2014.09); *A63F 13/71* (2014.09); *A63F 13/92* (2014.09); *A63F 2300/1031* (2013.01); *A63F 2300/1043* (2013.01); *A63F 2300/1075* (2013.01); *A63F 2300/532* (2013.01)

(58) Field of Classification Search
None
See application file for complete search history.

(56) References Cited

U.S. PATENT DOCUMENTS

| | | | | |
|---|---|---|---|---|
| 9,081,545 | B1* | 7/2015 | Lin .......................... | A63F 13/98 |
| 10,525,360 | B1* | 1/2020 | Corigliano .............. | A63F 13/92 |
| 2002/0155890 | A1* | 10/2002 | Ha .......................... | A63F 13/23 |
| | | | | 463/36 |
| 2003/0186746 | A1* | 10/2003 | Chuang .................. | A63F 13/235 |
| | | | | 463/42 |
| 2007/0021210 | A1* | 1/2007 | Tachibana .............. | A63F 13/211 |
| | | | | 463/37 |
| 2009/0154095 | A1* | 6/2009 | Woud ..................... | H02J 7/0042 |
| | | | | 361/679.56 |
| 2009/0312098 | A1* | 12/2009 | Chang ..................... | A63F 13/08 |
| | | | | 463/31 |
| 2013/0267322 | A1* | 10/2013 | South ..................... | A63F 13/235 |
| | | | | 463/38 |
| 2014/0228075 | A1* | 8/2014 | Baschnagel ............. | H04M 1/04 |
| | | | | 455/557 |

(Continued)

OTHER PUBLICATIONS

Notebook Italia, Razer Kishi and Razer Junglecat mobile gaming controllers, Jan. 30, 2020, https://www.youtube.com/watch?v=DvCNh-ylGXc , p. 1 (Year: 2020).*

(Continued)

*Primary Examiner* — Tramar Harper
(74) *Attorney, Agent, or Firm* — Li & Cai Intellectual Property Office

(57) ABSTRACT

A game controller is provided. The game controller includes a first handle, a second handle, and a function expansion module. The first handle and the second handle are connected to each other to jointly form an accommodating space. The function expansion module is disposed in the accommodating space between the first handle and the second handle. The function expansion module is connected to the first handle or the second handle.

10 Claims, 8 Drawing Sheets

(56) References Cited

U.S. PATENT DOCUMENTS

| | | | | |
|---|---|---|---|---|
| 2014/0274394 A1* | 9/2014 | Willis | .................... | G06F 1/1656 |
| | | | | 463/37 |
| 2015/0031452 A1* | 1/2015 | Rundell | ................. | A63F 13/92 |
| | | | | 463/31 |
| 2015/0273325 A1* | 10/2015 | Falc | ...................... | G06F 1/1626 |
| | | | | 463/37 |
| 2015/0281422 A1* | 10/2015 | Kessler | ............... | H04M 11/007 |
| | | | | 455/557 |
| 2016/0107082 A1* | 4/2016 | Song | ...................... | A63F 13/24 |
| | | | | 463/37 |
| 2016/0149426 A1* | 5/2016 | Hodges | .................. | H02J 50/10 |
| | | | | 320/108 |
| 2017/0315626 A1* | 11/2017 | Townley | ............... | G06F 1/1632 |
| 2018/0345130 A1* | 12/2018 | Wells | ...................... | A63F 13/92 |
| 2020/0078670 A1* | 3/2020 | Oh | ..................... | H05K 7/20172 |
| 2020/0155928 A1* | 5/2020 | Guo | ........................ | A63F 13/24 |
| 2020/0324197 A1* | 10/2020 | Ho | ........................ | A63F 13/213 |
| 2021/0205699 A1* | 7/2021 | Chung | .................... | A63F 13/98 |
| 2021/0283515 A1* | 9/2021 | Del Valle | ................ | A63F 13/92 |

OTHER PUBLICATIONS

Geekazine, Razer Kishi Adds the Game Controller You Want for Your Phone, Feb. 10, 2020, https://www.youtube.com/watch?v=uvT_4bm6SLQ , p. 1 (Year: 2020).*

* cited by examiner

GAME CONTROLLER

CROSS-REFERENCE TO RELATED PATENT APPLICATION

This application claims the benefit of priority to Taiwan Patent Application No. 109139261, filed on Nov. 11, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a game controller, and more particularly to a combination game controller.

BACKGROUND OF THE DISCLOSURE

Game controllers are usually connected to a mobile device or a game console, and are mostly limited to controlling in-game interactions in terms of usage method or usage scenario.

Therefore, how to provide a game controller that allows for more usage scenarios has become one of the important issues to be solved in this industry.

SUMMARY OF THE DISCLOSURE

In response to the above-referenced technical inadequacies, the present disclosure provides a game controller.

In one aspect, the present disclosure provides a game controller that includes a first handle, a second handle, and a function expansion module. The first handle and the second handle are connected to each other to jointly form an accommodating space. The function expansion module is disposed in the accommodating space between the first handle and the second handle, and is connected to the first handle or the second handle.

Therefore, one of the beneficial effects of the present disclosure is that the game controller provided herein can be connected to the function expansion module to expand usage scenarios of the game controller. The game controller, apart from being a controller for games, can also be used as an interactive input device for various electronic devices.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
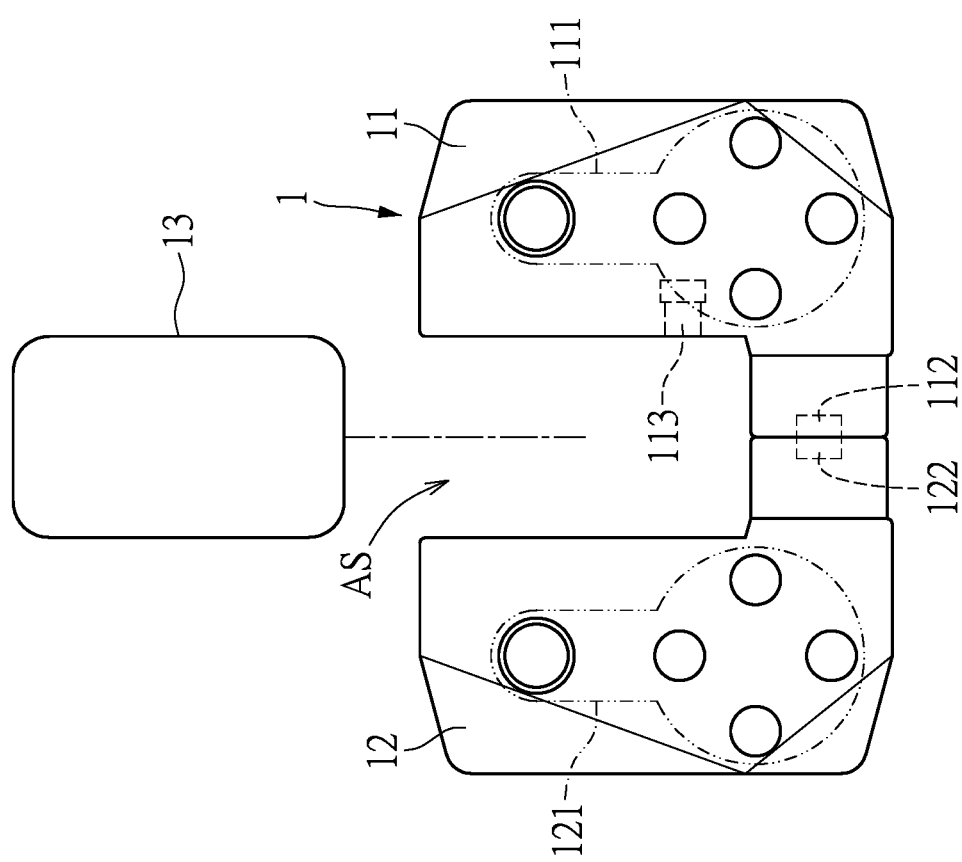
FIG. 1 is a schematic view of a game controller according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
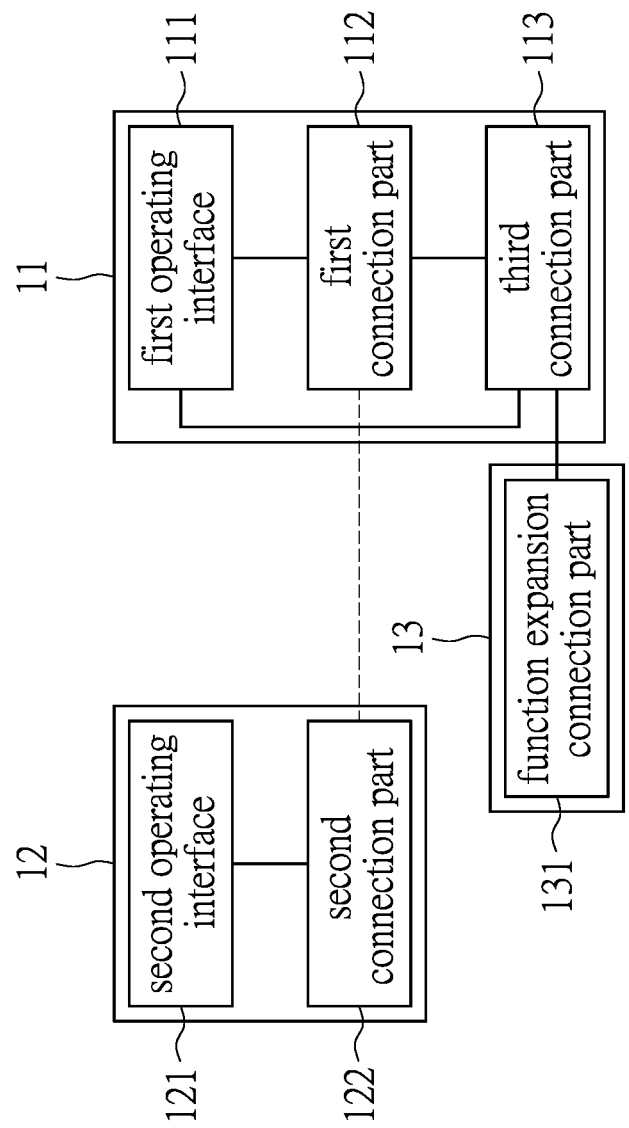
FIG. 2 is a functional block diagram of the game controller according to one embodiment of the present disclosure.
Figure 3:
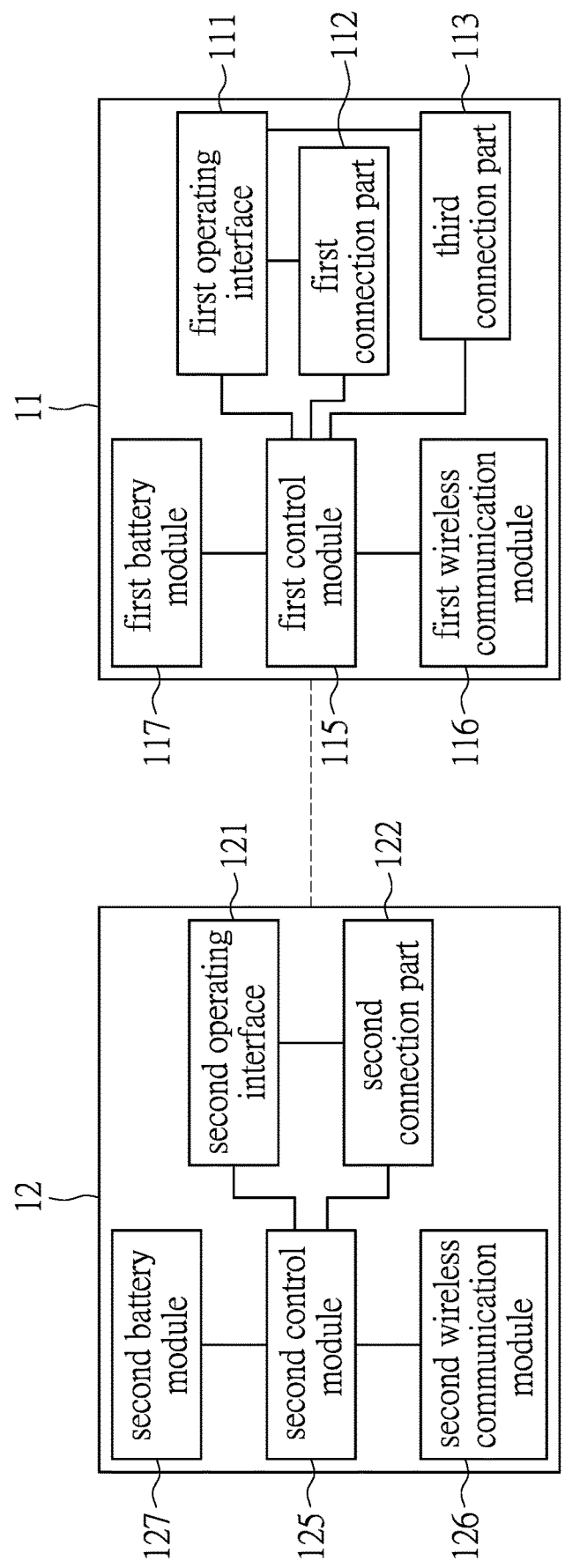
FIG. 3 is another functional block diagram of the game controller according to one embodiment of the present disclosure.

References are made to FIG. 1 to FIG. 3, in which FIG. 1 is a schematic view of a game controller according to one embodiment of the present disclosure, FIG. 2 is a functional block diagram of the game controller according to one embodiment of the present disclosure, and FIG. 3 is another functional block diagram of the game controller according to one embodiment of the present disclosure.

A game controller 1 includes a first handle 11, a second handle 12, and a function expansion module 13. The first handle 11 and the second handle 12 are connected to each other to jointly form an accommodating space AS. The function expansion module 13 is disposed in the accommodating space AS between the first handle 11 and the second handle 12, and is connected to the first handle 11 or the second handle 12.

In the present embodiment, the function expansion module 13 is communicatively connected or electrically connected to the first handle 11 or the second handle 12.

The first handle 11 includes a first operating interface 111, a first connection part 112, and a third connection part 113. The first operating interface 111 is electrically connected to the first connection part 112 and the third connection part 113. The second handle 12 includes a second operating interface 121 and a second connection part 122. The second operating interface 121 is electrically connected to the second connection part 122. The function expansion module 13 includes at least a function expansion connection part 131.

In the present embodiment, the first handle 11 and the second handle 12 can be connected to each other through the first connection part 112 and the second connection part 122.

The third connection part 113 of the first handle 11 is electrically connected to the function expansion connection part 131 of the function expansion module 13.

The first handle 11 further includes a first control module 115, a first wireless communication module 116, and a first battery module 117. The first control module 115 is electrically connected to the first operating interface 111, the first connection part 112, the third connection part 113, the first wireless communication module 116, and the first battery module 117.

The second handle 12 further includes a second control module 125, a second wireless communication module 126, and a second battery module 127. The second control module 125 is electrically connected to the second operating interface 121, the second connection part 122, the second wireless communication module 126, and the second battery module 127.

The first control module 115 transmits a plurality of first control signals to the second wireless communication module 126 of the second handle 12 through the first wireless communication module 116. The second wireless communication module 126 then transmits the first control signals that are received to the second control module 125.

Similarly, the second control module 125 can also transmit a plurality of second control signals to the first wireless communication module 116 of the first handle 11 through the second wireless communication module 126. The first wireless communication module 116 transmits the second control signals that are received to the first control module 115. The first wireless communication module 116 and the second wireless communication module 126 can then be used to communicatively connect to a mobile device MD.

The first battery module 117 provides an electrical energy to the first control module 115, the first wireless communication module 116, and the first operating interface 111.

The first battery module 117 of the first handle 11 provides the electrical energy to the second handle 12 through the first connection part 112 and the second connection part 122. The first battery module 117 provides the electrical energy to the function expansion module 13 through the third connection part 113 and the function expansion connection part 131.

Moreover, the third connection part 113 of the first handle 11 is electrically connected to the function expansion connection part 131 of the function expansion module 13.

The second battery module 127 of the second handle 12 is electrically connected to the second wireless communication module 126. The second battery module 127 can provide an electrical energy to the second wireless communication module 126, the second control module 125, and the second operating interface 121. The second battery module 127 of the second handle 12 provides the electrical energy to the first handle 11 through the first connection part 112 and the second connection part 122.

In the present embodiment, the first handle 11 and the second handle 12 can transmit an electrical energy to each other, so as to improve a usage efficiency of the game controller 1.

The first connection part 112, the second connection part 122, the third connection part 113, and the function expansion connection part 131 can each be a micro universal serial bus (USB) connector, a Type A USB connector, a Type C USB connector, or a LIGHTNING connector.

The first control module 115 and the second control module 125 can each be a central processing unit (CPU), an application-specific integrated circuit (ASIC), or a micro control unit (MCU).

The first battery module 117 and the second battery module 127 can each be a lithium ion battery, a lithium manganese dioxide battery, a lithium polymer battery, or a nickel hydrogen battery.

The first wireless communication module 116 and the second wireless communication module 126 can each be a WI-FI® communication unit, a BLUETOOTH® communication unit, a Zigbee communication unit, a LoRa communication unit, a Sigfox communication unit, or an NB-IoT communication unit.

The first operating interface 111 and the second operating interface 121 can each be a button, a joystick, or a touchscreen interface, but the present disclosure is not limited thereto.

Figure 4:
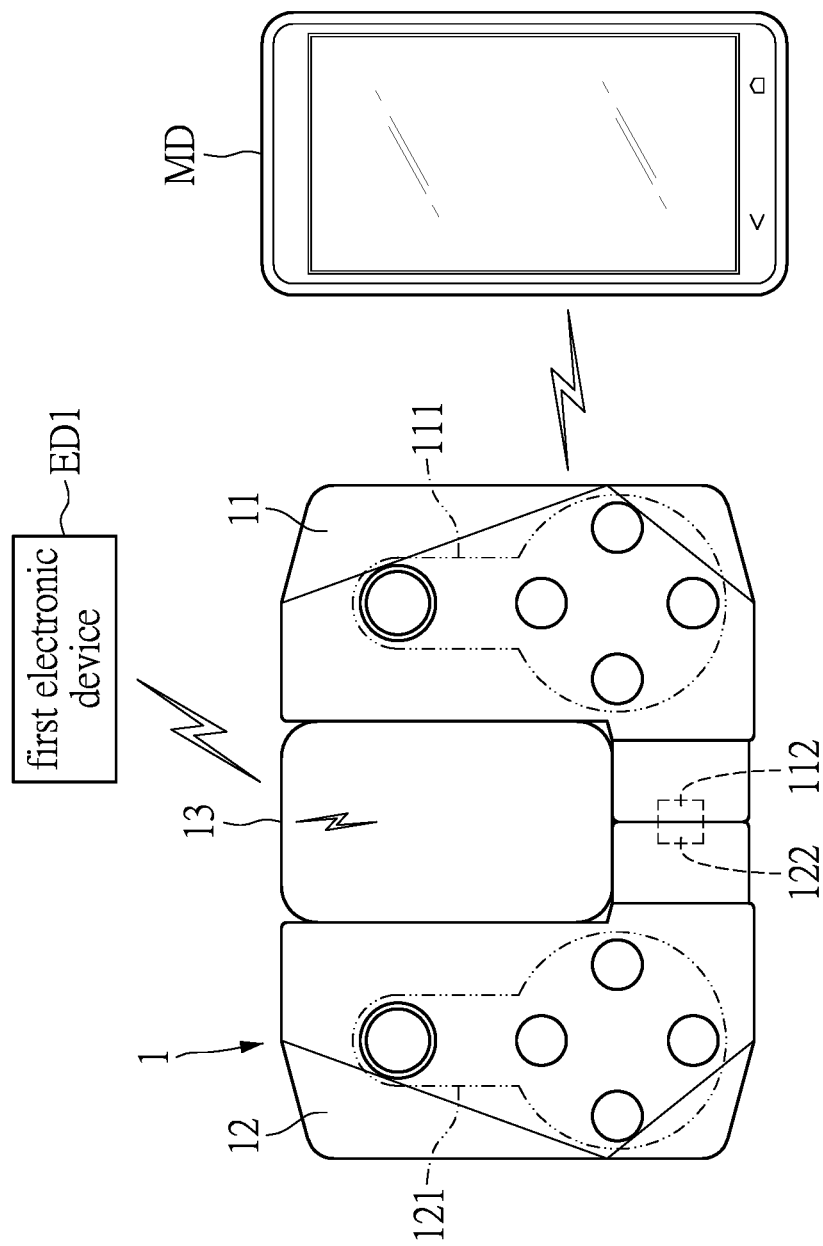
FIG. 4 is a schematic view of the game controller of the present disclosure including a function expansion module and being connected to a first electronic device and a mobile device.

Reference is made to FIG. 4, which is a schematic view of the game controller of the present disclosure including a function expansion module and being connected to a first electronic device and a mobile device.

In the present embodiment, the function expansion module 13 is a wireless communication circuit. The game controller 1 provides an electrical energy to the function expansion module 13 through the third connection part 113.

The game controller 1 is connected to the function expansion module 13 through the first wireless communication module 116 or the second wireless communication module 126, so as to be connected to a first electronic device ED1.

The game controller 1 provides a plurality of function expansion communication signals to the first electronic device ED1 through the function expansion module 13.

The function expansion module 13 can be a WI-FI® communication unit, a BLUETOOTH® communication unit, a Zigbee communication unit, a LoRa communication unit, a Sigfox communication unit, or an NB-IoT communication unit.

In other words, the game controller 1 can be in communication with the mobile device MD through the first wireless communication module 116 or the second wireless communication module 126. The game controller 1 can further be communicatively connected to other electronic devices (such as the first electronic device ED1) by being connected to the function expansion module 13. In this way, the game controller 1 can transmit communication not only to the mobile device MD, but also to the other electronic devices through the function expansion module 13.

Figure 5:
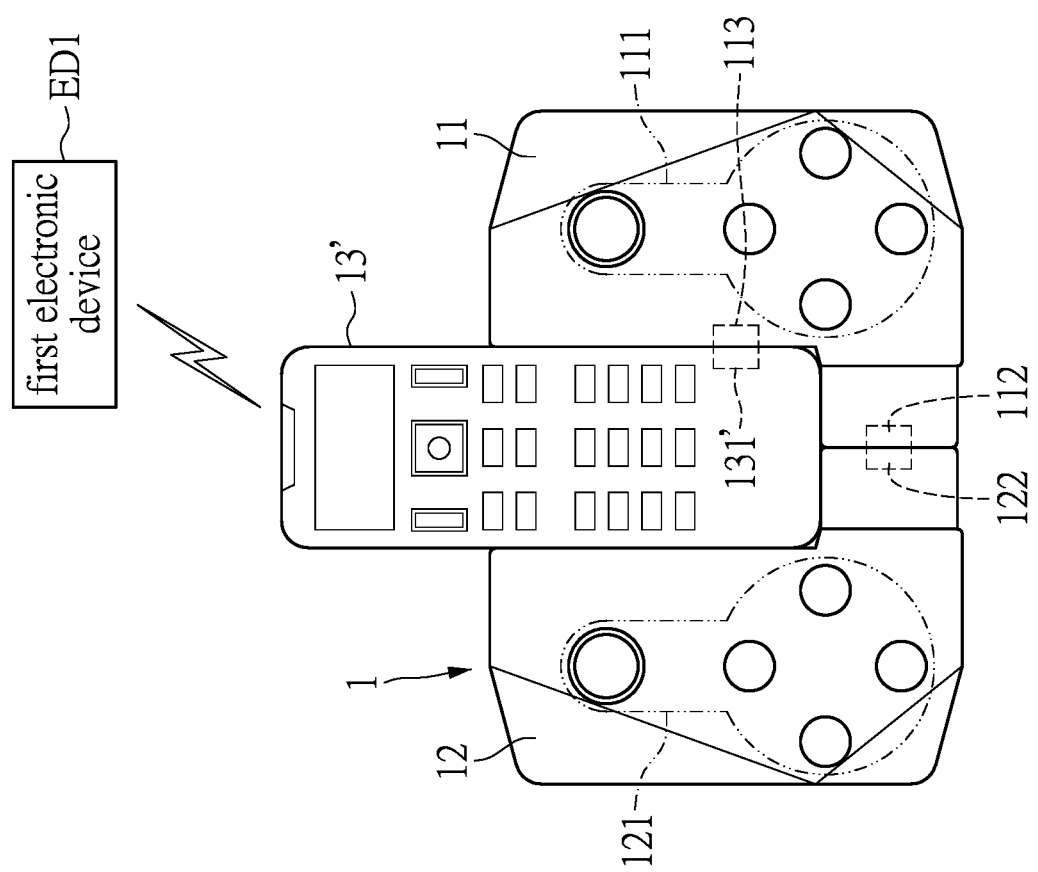
FIG. 5 is a schematic view of the game controller of the present disclosure including the function expansion module and being connected to the first electronic device.

Reference is made to FIG. 5, which is a schematic view of the game controller of the present disclosure including the function expansion module and being connected to the first electronic device.

A function expansion module 13' is a remote control circuit.

The game controller 1 is connected to a function expansion connection part 131' through the third connection part 113 to provide an electrical energy to the function expansion module 13. The game controller 1 provides a plurality of auxiliary remote control signals to the first electronic device ED1 through the function expansion module 13, so as to control the first electronic device ED 1. The auxiliary remote control signals are infrared remote control signals, WI-FI® remote control signals, or BLUETOOTH® remote control signals.

When the function expansion module 13' is the remote control circuit, the function expansion module 13 can be a button remote control circuit or a touch remote control circuit.

Figure 6:
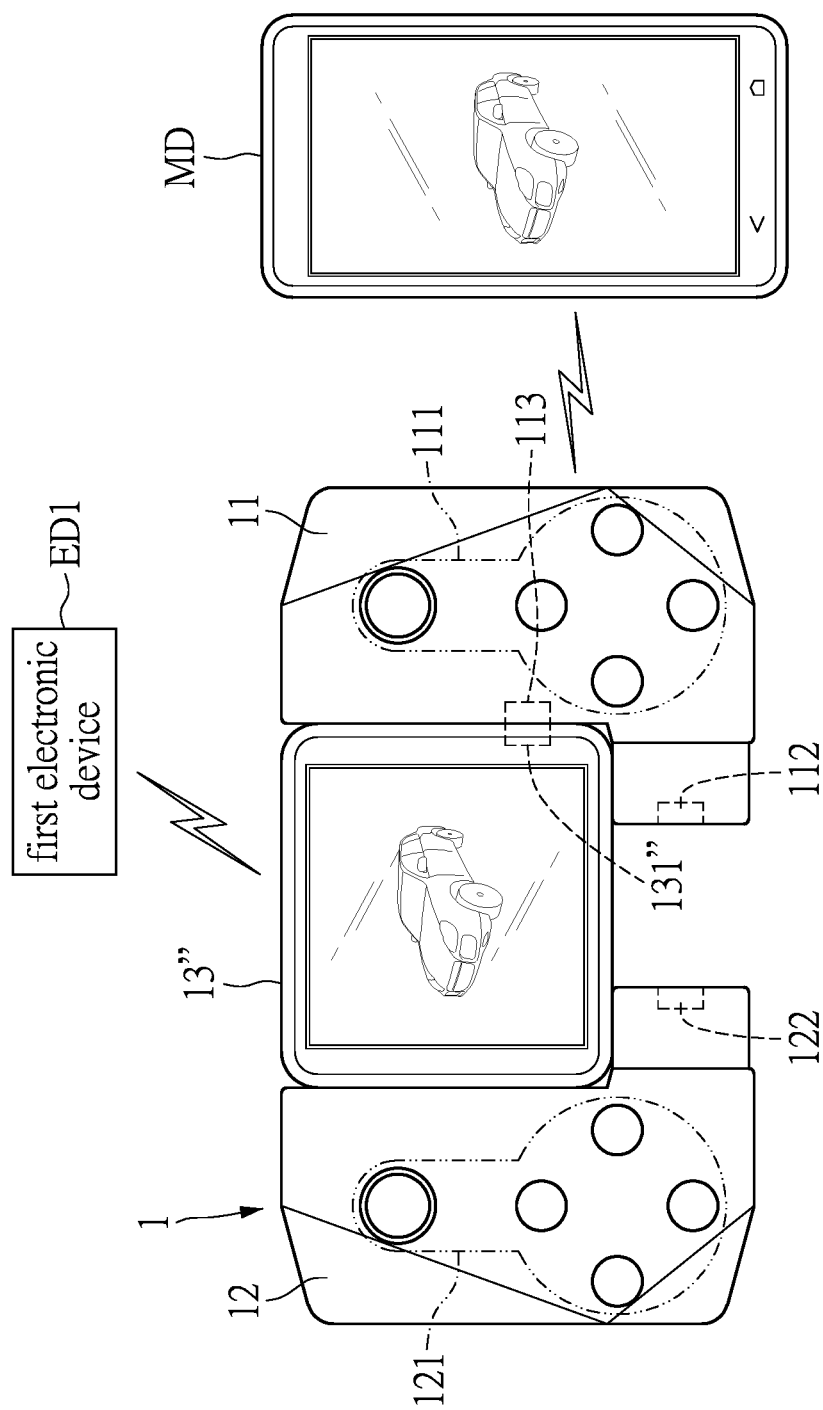
FIG. 6 is another schematic view of the game controller of the present disclosure including the function expansion module and being connected to the first electronic device and the mobile device.

Reference is made to FIG. 6, which is another schematic view of the game controller of the present disclosure including the function expansion module and being connected to the first electronic device and the mobile device.

A function expansion module 13" is a display circuit. The game controller 1 is connected to the function expansion module 13 through the first wireless communication module 116 or the second wireless communication module 126, so as to be connected to the first electronic device ED1.

The first electronic device ED1 can transmit a display image data or a control image data to the function expansion module 13" for display through the first wireless communication module 116 or the second wireless communication module 126. That is, the game controller 1 can receive the display image data or the control image data transmitted by the first electronic device ED1 or the mobile device MD.

In other embodiments, the game controller 1 can also transmit the display image data or the control image data to the function expansion module 13" through the third connection part 113 of the first handle 11 and a function expansion connection part 131" of the function expansion module 13".

When the function expansion module 13" is the display circuit, a plurality of touch control signals of the function expansion module 13" can be transmitted to the first electronic device ED1 for control or display through the function expansion connection part 131", the third connection part 113 of the first handle 11, or the first wireless communication module 116.

In the present embodiment, the function expansion module 13 can be a touch display circuit, a liquid-crystal display circuit, a light-emitting diode display circuit, or an organic light-emitting diode display circuit.

Figure 7:
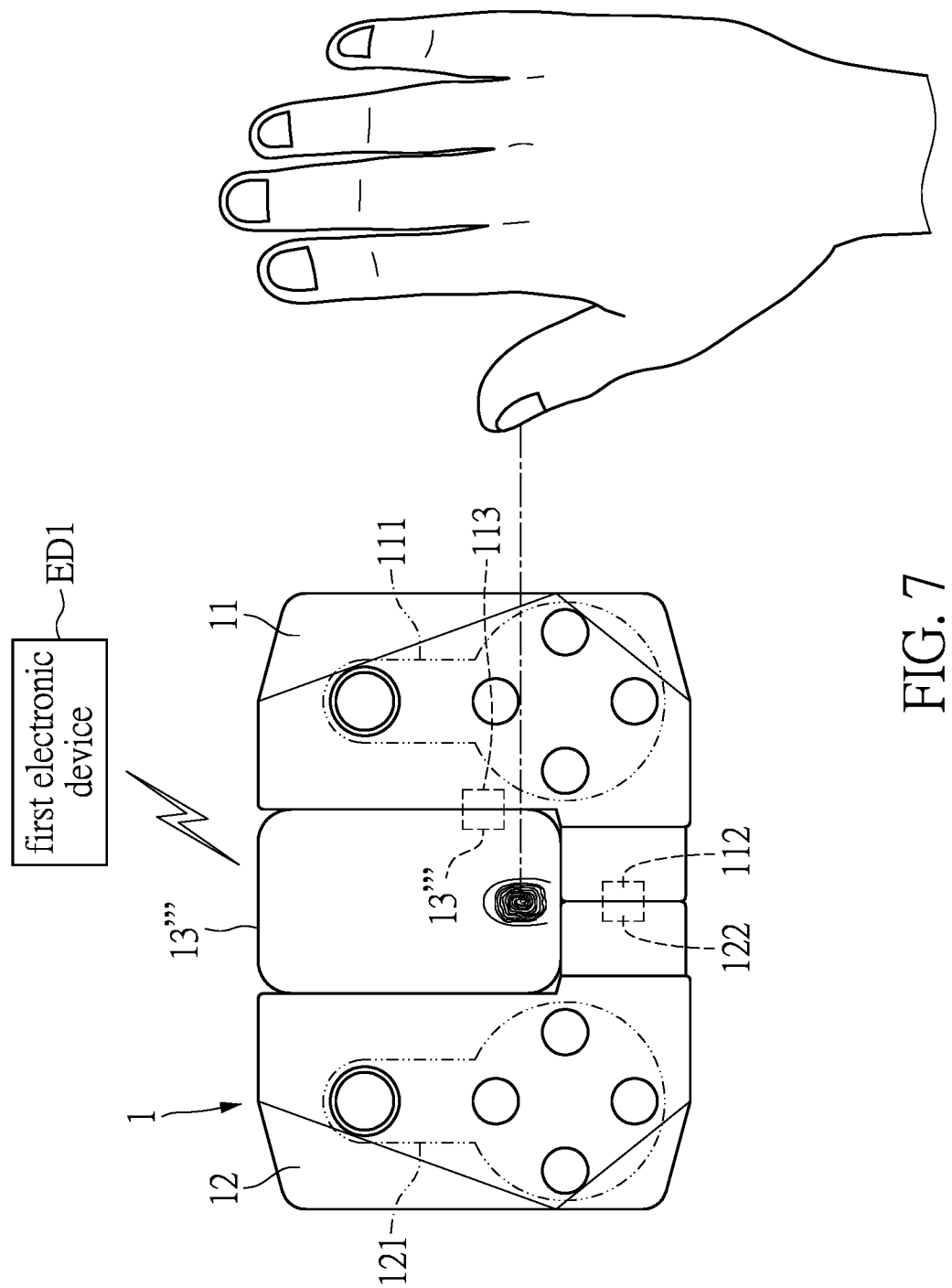
FIG. 7 is another schematic view of the game controller of the present disclosure including the function expansion module and being connected to the first electronic device.

Reference is made to FIG. 7, which is another schematic view of the game controller of the present disclosure including the function expansion module and being connected to the first electronic device.

A function expansion module 13'" can also be an authentication function unit. When the function expansion module 13 is the authentication function unit, the function expansion module 13 as a device having an authentication function can capture an authentication data of a user, and transmit the authentication data to an electronic device ED through the first handle 11 or the second handle 12, so as to perform an authentication process.

When the function expansion module 13'" is the authentication function unit, the function expansion module 13'" can be a card reader, a fingerprint recognition device, an iris recognition device, a voiceprint recognition device, a vein recognition device, or a handwriting recognition device.

Figure 8:
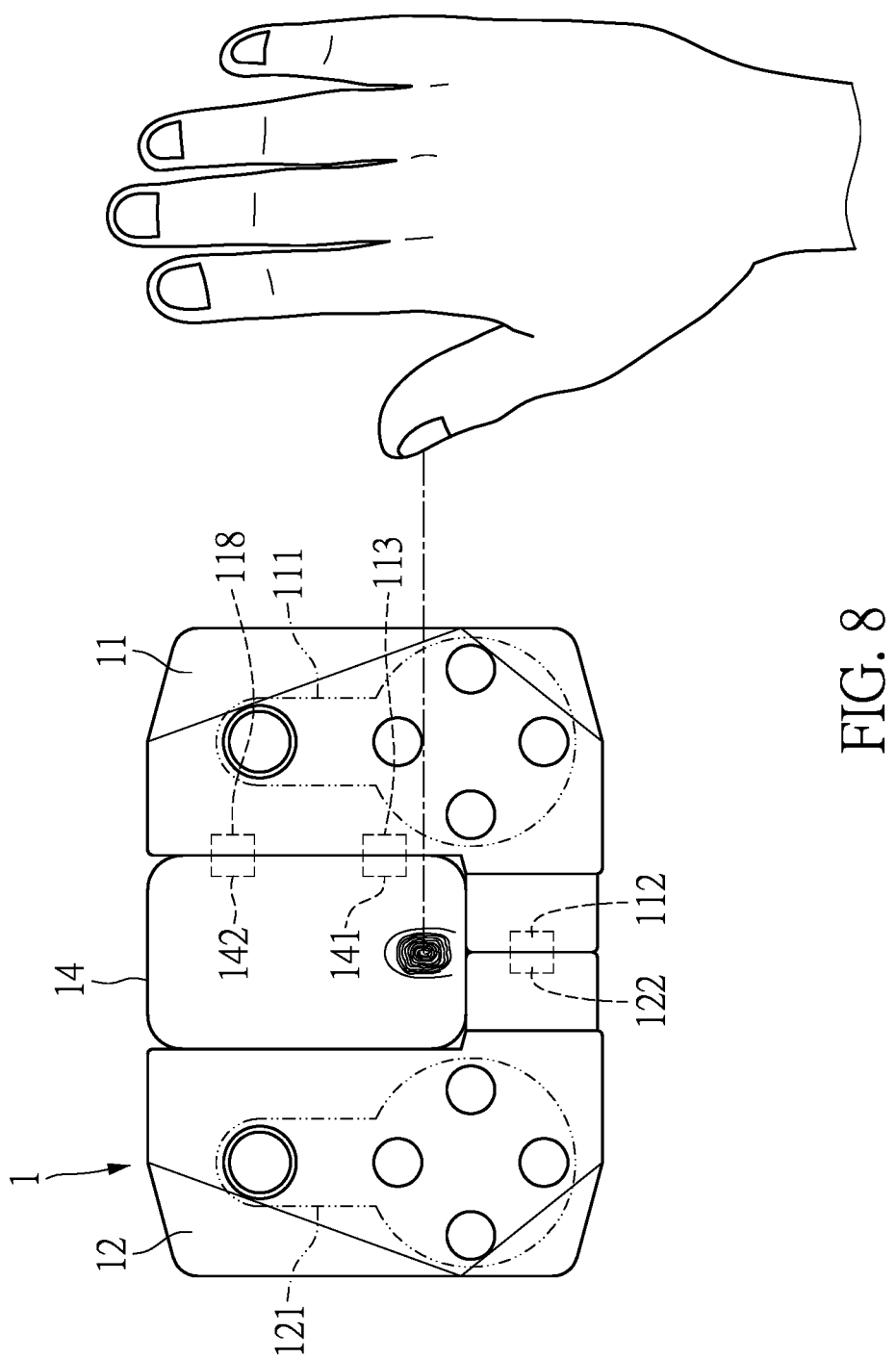
FIG. 8 is another schematic view of the game controller according to one embodiment of the present disclosure.

Reference is made to FIG. 8, which is another schematic view of the game controller according to the embodiment of the present disclosure.

The first handle 11 further includes an electrical connection part 118. A function expansion module 14 further includes an expansion electrical connection part 142, in addition to a function expansion connection part 141. The electrical connection part 118 of the first handle 11 is electrically connected to the expansion electrical connection part 142 of the function expansion module 14.

The first handle 11 provides an electrical energy to the function expansion module 14 through the electrical connection part 118 and the expansion electrical connection part 142.

In conclusion, one of the beneficial effects of the present disclosure is that the game controller provided herein can be connected to the function expansion module to expand usage scenarios of the game controller. The game controller, apart from being a controller for games, can also be used as an interactive input device for various electronic devices.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A game controller, comprising:
   a first handle;
   a second handle connected to the first handle to jointly form an accommodating space; and
   a function expansion module disposed in the accommodating space between the first handle and the second handle, the function expansion module being connected to the first handle or the second handle;
   wherein the first handle includes a first connection part, and the second handle includes a second connection part, and wherein the first handle and the second handle are connected to each other through the first connection part and the second connection part;
   wherein the first handle further includes a third connection part and a first operating interface, and the first operating interface is electrically connected to the third connection part, and wherein the second handle further includes a second operating interface, and the third connection part of the first handle is electrically connected to a function expansion connection part of the function expansion module;
   wherein the first handle further includes a first control module and a first wireless communication module, and the first wireless communication module, the first operating interface, and the third connection part are electrically connected to the first control module, wherein the second handle further includes a second wireless communication module, and the first control module transmits a plurality of first control signals to the second wireless communication module of the second handle through the first wireless communication module, wherein the second wireless communication module transmits the first control signals that are received to a second control module, and the second control module transmits a plurality of second control signals to the first wireless communication module of the first handle through the second wireless communication module, and wherein the first wireless communication module transmits the second control signals that are received to the first control module, and the first wireless communication module and the second wireless communication module are used to communicatively connect to a mobile device;

wherein the first handle further includes a first battery module that is electrically connected to the first control module to provide an electrical energy to the first control module, the first wireless communication module, and the first operating interface, and wherein the first battery module of the first handle provides the electrical energy to the second handle through the first connection part and the second connection part, and the first battery module provides the electrical energy to the function expansion module through the third connection part.

2. The game controller according to claim 1, wherein the second handle further includes a second battery module that is electrically connected to the second wireless communication module to provide an electrical energy to the second wireless communication module and the second operating interface, and the second battery module of the second handle provides the electrical energy to the first handle through the first connection part and the second connection part.

3. The game controller according to claim 1, wherein the function expansion module is a remote control circuit, and wherein the game controller provides an electrical energy to the function expansion module through the third connection part, the game controller provides a plurality of auxiliary remote control signals to a first electronic device through the function expansion module so as to control the first electronic device, and the auxiliary remote control signals are infrared remote control signals, WI-FI® remote control signals, or BLUETOOTH® remote control signals.

4. The game controller according to claim 3, wherein, when the function expansion module is the remote control circuit, the function expansion module is a button remote control circuit or a touch remote control circuit.

5. A game controller, comprising:
a first handle;
a second handle connected to the first handle to jointly form an accommodating space; and
a function expansion module disposed in the accommodating space between the first handle and the second handle, the function expansion module being connected to the first handle or the second handle;
wherein the first handle includes a first connection part, and the second handle includes a second connection part, and wherein the first handle and the second handle are connected to each other through the first connection part and the second connection part;
wherein the first handle further includes a third connection part and a first operating interface, and the first operating interface is electrically connected to the third connection part, and wherein the second handle further includes a second operating interface, and the third connection part of the first handle is electrically connected to a function expansion connection part of the function expansion module;

wherein the first handle further includes a first control module and a first wireless communication module, and the first wireless communication module, the first operating interface, and the third connection part are electrically connected to the first control module, wherein the second handle further includes a second wireless communication module, and the first control module transmits a plurality of first control signals to the second wireless communication module of the second handle through the first wireless communication module, wherein the second wireless communication module transmits the first control signals that are received to a second control module, and the second control module transmits a plurality of second control signals to the first wireless communication module of the first handle through the second wireless communication module, and wherein the first wireless communication module transmits the second control signals that are received to the first control module, and the first wireless communication module and the second wireless communication module are used to communicatively connect to a mobile device;

wherein the function expansion module is a wireless communication circuit, and wherein the game controller provides an electrical energy to the function expansion module through the third connection part, the game controller is connected to a first electronic device through the first wireless communication module or the second wireless communication module, and the game controller provides a plurality of function expansion communication signals to the first electronic device through the function expansion module.

6. A game controller, comprising:
a first handle;
a second handle connected to the first handle to jointly form an accommodating space; and
a function expansion module disposed in the accommodating space between the first handle and the second handle, the function expansion module being connected to the first handle or the second handle;
wherein the first handle includes a first connection part, and the second handle includes a second connection part, and wherein the first handle and the second handle are connected to each other through the first connection part and the second connection part;
wherein the first handle further includes a third connection part and a first operating interface, and the first operating interface is electrically connected to the third connection part, and wherein the second handle further includes a second operating interface, and the third connection part of the first handle is electrically connected to a function expansion connection part of the function expansion module;
wherein the first handle further includes a first control module and a first wireless communication module, and the first wireless communication module, the first operating interface, and the third connection part are electrically connected to the first control module, wherein the second handle further includes a second wireless communication module, and the first control module transmits a plurality of first control signals to the second wireless communication module of the second handle through the first wireless communication module, wherein the second wireless communication module transmits the first control signals that are received to a second control module, and the second control module transmits a plurality of second control signals to the first wireless communication module of the first handle through the second wireless communication module, and wherein the first wireless communication module transmits the second control signals that are received to the first control module, and the first wireless communication module and the second wireless communication module are used to communicatively connect to a mobile device;

wherein the function expansion module is a display circuit, and wherein the game controller is connected to a first electronic device through the first wireless communication module or the second wireless communication module, and the first electronic device transmits a display image data or a control image data to the function expansion module for display through the first wireless communication module or the second wireless communication module.

7. The game controller according to claim 6, wherein, when the function expansion module is a touch display circuit, a plurality of touch control signals of the function expansion module are transmitted to the first electronic device for control or display through the function expansion connection part, the third connection part of the first handle, and the first wireless communication module.

8. A game controller, comprising:
a first handle;
a second handle connected to the first handle to jointly form an accommodating space; and
a function expansion module disposed in the accommodating space between the first handle and the second handle, the function expansion module being connected to the first handle or the second handle;
wherein the first handle includes a first connection part, and the second handle includes a second connection part, and wherein the first handle and the second handle are connected to each other through the first connection part and the second connection part;
wherein the first handle further includes a third connection part and a first operating interface, and the first operating interface is electrically connected to the third connection part, and wherein the second handle further includes a second operating interface, and the third connection part of the first handle is electrically connected to a function expansion connection part of the function expansion module;
wherein the first handle further includes a first control module and a first wireless communication module, and the first wireless communication module, the first operating interface, and the third connection part are electrically connected to the first control module, wherein the second handle further includes a second wireless communication module, and the first control module transmits a plurality of first control signals to the second wireless communication module of the second handle through the first wireless communication module, wherein the second wireless communication module transmits the first control signals that are received to a second control module, and the second control module transmits a plurality of second control signals to the first wireless communication module of the first handle through the second wireless communication module, and wherein the first wireless communication module transmits the second control signals that are received to the first control module, and the first wireless communication module and the second wireless communication module are used to communicatively connect to a mobile device;

wherein, when the function expansion module is an authentication function unit, the authentication function unit captures an authentication data of a user and transmits the authentication data to an electronic device through the first handle or the second handle, so as to perform an authentication process.

9. The game controller according to claim 8, wherein the authentication function unit is a card reader, a fingerprint recognition device, an iris recognition device, a voiceprint recognition device, a vein recognition device, or a handwriting recognition device.

10. The game controller according to claim 8, wherein the first handle further includes an electrical connection part, and wherein the function expansion module includes an expansion electrical connection part, the electrical connection part of the first handle is electrically connected to the expansion electrical connection part of the function expansion module, and the first handle provides an electrical energy to the function expansion module through the electrical connection part and the expansion electrical connection part.

* * * * *